US007107179B2

(12) United States Patent
Malchi et al.

(10) Patent No.: US 7,107,179 B2
(45) Date of Patent: Sep. 12, 2006

(54) PASSIVE TARGET DATA ACQUISITION METHOD AND SYSTEM

(76) Inventors: Tomer Malchi, 18 Michal Street, 62361 Tel-Aviv (IL); Yaniv Malchi, 18 Michal Street, 62361 Tel-Aviv (IL)

( * ) Notice: Subject to any disclaimer, the term of this patent is extended or adjusted under 35 U.S.C. 154(b) by 0 days.

(21) Appl. No.: 11/205,697

(22) Filed: Aug. 17, 2005

(65) Prior Publication Data

US 2005/0273254 A1 Dec. 8, 2005

(51) Int. Cl.
*G06F 19/00* (2006.01)

(52) U.S. Cl. .................................... 702/152; 702/150

(58) Field of Classification Search ................ 702/92, 702/150, 152, 153
See application file for complete search history.

(56) References Cited

U.S. PATENT DOCUMENTS

| 4,954,837 | A | * | 9/1990 | Baird et al. ................. 342/458 |
| 5,086,396 | A | | 2/1992 | Waruszewski, Jr. |
| 5,825,480 | A | | 10/1998 | Udagawa et al. |
| 6,064,942 | A | | 5/2000 | Johnson et al. |
| 6,222,464 | B1 | | 4/2001 | Tinkel et al. |
| 6,343,245 | B1 | | 1/2002 | Degnan |
| 6,418,371 | B1 | | 7/2002 | Arnold |
| 6,668,218 | B1 | | 12/2003 | Bulow et al. |
| 2002/0180636 | A1 | | 12/2002 | Lin et al. |
| 2004/0041999 | A1 | * | 3/2004 | Hogan et al. ............. 356/141.5 |

FOREIGN PATENT DOCUMENTS

GB 2 254 214 A 9/1992

OTHER PUBLICATIONS

Moccia, A; Vetrella, Ponte, S; "Passive and Active Calibrator Characterization Using a Spaceborne Sar System Simulator"; IEEE Transactions on Geoscience and Remote Sensing; vol. 32; iss 3; May 1994; pp. 715-721.*

International Preliminary Report on Patentability and Written Opinion dated Apr. 14, 2005, of International Application No. PCT/IL2004/000198 filed Mar. 1, 2004.

Stiles P. N. "Terrain Intervisibility believe it or not?" Digital Avionics Systems Conferences, 2000, Proceedings, DASC. The 19th Oct. 7-13, 2000, Piscataway, NY, USA, IEEE, vol. 2, Oct. 7, 2000, pp. 5A21-5A27, XP010522734, ISBN: 0-7803-6395-7.

Yacoob, Y. et al., "Computational Ground and Airborne Localization over Rough Terrain" Proceedings of the Computer Society conference on Computer Vision and Pattern Recognition, Champaign, IL, Jun. 15-18, 1992, New York, IEEE, US, Jun. 15, 1992, pp. 781-783, XP010029408, ISBN: 0-8186-2855-3.

* cited by examiner

*Primary Examiner*—John Barlow
*Assistant Examiner*—Douglas N. Washburn
(74) *Attorney, Agent, or Firm*—Frishauf, Holtz, Goodman & Chick, P.C.

(57) ABSTRACT

Method and passive target data acquisition system operable continuously from an observation point for passively sighting a target and acquiring the target on a DTM for passively deriving target data and associated information without emitting radiations prone to detection. The location of the target is shown on a display, and so is an error-area due to measurement inaccuracies. When terrain topography causes the system to indicate more than one error-area, the target and the accompanying error-areas are displayed. The distance between error-areas indicates dead terrain zones. A north finding procedure provides accurate north direction correction to rough north readings taken with a coarse north-indicating device. The system is small enough for integration with handheld personal binoculars, and is operable from static and mobile observation points, possibly on a stabilized platform, on land, at sea, in the air, and in space.

25 Claims, 10 Drawing Sheets

PASSIVE TARGET DATA ACQUISITION METHOD AND SYSTEM

The present application claims priority of PCT International Application No. PCT/IL2004/000198, filed Mar. 1, 2004, the priority date of which is claimed herein, and the entire disclosure of which is incorporated herein by reference.

TECHNICAL FIELD

The present invention relates in general to the field of navigation digital map utilization. More particularly the present invention refers to a method and a system for passive target data acquisition with respect to a digital map, and furthermore, to the use of the method and system for finding the accurate-north direction.

BACKGROUND ART

Sighting means for target data acquisition are well known per se. These optical instruments are used by geodesists and by artillerists for example. Such equipment is comparable to a theodolite or transit compass, with a turntable for pointing a telescope toward a target. Typically, a compass, a computer with a CPU for running computer programs, an I/O unit, a memory, and a display device, or simply display, are included. Tilt and yaw angles from an observation site to a target are measured with a vernier. Most often, an active range-measuring device, such as an LRF, is also included.

It is taken for granted that modern sighting devices all include an optical device, e.g. a telescope or binoculars, and have to be powered-up and leveled before use. Optics, power-on, and leveling are standard and common practice in the art, and will therefore not be mentioned in the description below.

Also known in the art is the acronym DTM (digital terrain model), or DEM (digital elevation model) referring to a digitized topographic model, which provides a representation of a portion of terrain surface contour in the form of a three-dimensional digital map. Parties performing surface or volumetric calculations with respect to the modeled terrain, possibly make use of such a DTM. When the DTM is stored in a computer memory, it can be used as a unit in a terrain database. The stored DTM then provides the basic data for running surface and volumetric calculations implemented by a computer program associated with a computer and a computer memory. Various engineering, military and environmental related applications frequently refer to DTMs for surface or spatial calculations. A graphic illustration of a DTM is given in FIG. 1, to which reference is now made.

FIG. 1 shows a DTM surface S derived from a DTM database, associated with an (x,y,z) Cartesian-coordinate system, having a plane of grid points with (x,y) coordinates in the x-y plane. A (z) height-coordinate is defined for each discrete couple of (x,y) coordinates. Each point sampled on the terrain surface contour is represented by a junction of X and of Y lines in the grid. The height of each sampled point is given by values along the Z axis. The resolution of the sampling points of the DTM in the X–Y plane, and the accuracy of the height measurement of each sampled point depend on several factors, for example, on the quality of aerial photography from which the map was prepared.

In U.S. Pat. No. 5,086,396, Waruszewsky Jr. discloses "an aircraft navigation system" including "an inertial navigation system, a map of the terrain with elevation information stored in a digitized format as function of location, a typical energy managed of narrow (radar or laser) beam altimeter, a display system, and a central processing unit for processing data according to preselected programs. "This is an example of the use of a DTM for navigational purposes. Waruszewsky Jr. further points out that "The correct position of the aircraft with respect to the digitized map can permit the aircraft to engage in terrain following procedures using only the difficult to detect altitude range finding apparatus as a source of emitted electromagnetic radiation." Hereby, Waruszewsky Jr. hereby refers to the problems associated with the detection of active sensors.

In U.S. Pat. No. 6,222,464, Tinkel et al. divulge "A method of automated scan compensation in a target acquisition system for reducing areas of potential threat surrounding an aircraft. The target acquisition system includes a scanning device with adjustable scan limits for scanning a desired area in the vicinity of the aircraft. "In their invention, Tinkel et al. make use of adjustable scanning limits to define a scanned area. In the published US Patent Application No. 20020180636 Al, Lin, Chian-Fang, et al. teach a passive ranging/tracking processing method that provides information from passive sensors and associated tracking control devices and GPS/IMU integrated navigation system, so as to produce three dimensional position and velocity information of a target. The passive ranging/tracking processing method includes the procedure of producing two or more sets of rection measurements of a target with respect to a carrier, such as sets of elevation and azimuth angles, from two or more synchronized sets pf passive sensors and associated tracking control devices, installed on different locations of the carrier, computing the range vector measurement of the target with respect to the carrier using the two or more sets of direction measurements, and filtering the range vector measurement to estimate the three-dimensional position and velocity information of the target. Use is made of passive sensors, but there are needed two or more synchronized sets of passive sensors.

DISCLOSURE OF THE INVENTION

The problems solved by the present invention are twofold. First comes the problem of passive range and data acquisition of a sighted target, without emitting radiations. The second problem is that of starting with a coarse north direction to quickly obtain an accurate north indication, where accurate is defined as precise to ±1 mill.

The second problem is solved by two different methods. The first method uses the PTAS as a building block fed with actively measured range data toward a reference target. An accurate north finding procedure or NFP supports the evaluation of both calculated and measured data for deriving accurate north. The second method achieves super-rapid north finding (SRNF) based on the inherent capabilities of the PTAS when a singular target is available, as will be described below.

The first problem is thus to acquire target data without emitting signals, such as those radiated by a RF or laser device to prevent detection of the sighting by other parties. To solve the first problem, the invention uses a target data acquisition system (PTAS) with sighting means, operated from an observation position, with further means for accepting as input data, the location of the observation point, elevation angle and azimuth angle to the target, and further mean for processing the obtained input data in association with a DTM (digital terrain model). The terms DTM, DTM database, DTM surface are used interchangeably below, and so are the terms observation site, observation position, and observation point.

The PTAS processes the input data and calculates an intersection point of a line of sight (LOS), also referred to as sighting vector or simply vector, emanating from the observation point and directed toward a target, which intersection point designates the location of the target. Since the target is now a known point on the DTM surface derived from the DTM database, the target data are also known and available in digital format for further processing and even for transmission of data if desired. The operator is presented with a display of the DTM on which the target is pointed out, and over which one or more other maps or pictures may be superimposed, such as for example, a topographic, a satellite, an ortho-photo, or an aerial photography map. The terms Line of Sight (LOS), sighting vector, and vector are used interchangeably below.

It is taken for granted that reference to a display on a display module, or presentation on display, refers to both graphical and alphanumerical data, or associated information related or not to the graphical information. Target data and associated information are defined as desired regarding to their contents and presentation. The operator may select to view the information he desires as both or either only graphical or numerical data, by help of the I/O unit referred to above.

The PTAS also accepts as input the various inaccuracies of the input data, such as instrument inaccuracies in azimuth and in elevation angle, which are shown on the display as an area of uncertainty, or error area, related to the location of the target, in addition to the calculated target location. This feature is achieved by defining the measurement inaccuracies as an envelope surrounding the sighting vector, where the term envelope is used as a generic name for a three dimensional shape representing measurement inaccuracies. Calculation of the intersection of the envelope with the terrain surface contour of the DTM is shown on the display as an error area associated with the designated target.

It sometimes happens that the sighting vector hits a first portion of terrain, say a first forefront hill, which partially obscures a second background hill, whereby the envelope shrouding the sighting vector marks the DTM terrain surface contour on both the forefront and the background hill, forming two different separated apart error zones of the same target. To the operator this is a warning that the target may reside in either one of both error areas, and that the range to the target may vary accordingly.

Furthermore, when the envelope surrounding the sighting vector leaves more than one trace on the terrain, warning is provided that a "dead zone" or "hidden ground", or a terrain fold separates those traces, hiding entire surfaces from view. Such knowledge is of great importance to search parties, both for the rescue of survivors and for the arrest of smugglers.

Obtaining an accurate north reading is a second problem. The PTAS is instrumental as a basic building block, in association with an accurate north finding procedure NFP, for the fast determination of the accurate north direction. In this case, a coarse azimuth is sufficient when provided as input data of the PTAS, but an active range measurement device, such as a laser range finder (LFR) is required. Based upon the coarse azimuth reading and a few selected reference targets appropriately chosen on the DTM, a range to each reference target is calculated by the PTAS, and stored in memory. Then LRF readings to the same reference targets are taken, according to the data calculated by the PTAS, such as azimuth and elevation to the reference targets, and stored in association with the respective calculated reference target ranges. Next, the NFP is operated to find a common deviation factor that when applied as a common correction factor, will adjust the azimuth of the calculated and of the measured ranges. The common correction factor is the correction factor by which the coarse azimuth reading has to be corrected to indicate accurate north direction.

The method and system of the present invention are operable continuously from an observation point, which is land-based, sea borne, airborne, or based in space. Typically, a stabilized platform is advantageous for implementations that are operated when in motion, on land, sea, in the air and in space.

Development prototypes of the PTAS have been successfully operated in four specific fields of operation, namely transportation, military, paramilitary, and search and rescue applications. In relation to transportation systems, specifically for navigation, collision avoidance, and coastal navigation use. With the military, as add-ons for hand held items such as personal binoculars and light weapons, manned and unmanned airborne vehicles, including missiles and observation balloons, and also for target designation and tracking. Police, border patrols, and custom units have adopted the PTAS mainly for observation purposes and intrusion prevention, whereas for search and rescue activities, range and waypoint determination were tested.

For land-based field use, the time needed for deployment of commonly used systems ranges between 2 to 5 minutes from arrival at the observation point until acquisition of target data, whereas with the present invention, not more than one minute is necessary.

The following results were collected for 153 tests carried out with development units, for passive range measurement under various conditions: In 142 cases, representing about 92% of instances, range was and target data was calculated to an accuracy of ±20 m, for ranges between 100 m and 10000 m. Six more target data readings, or 4% were correct up to ±50 m, whereas the remaining 5 readings were off-range by more than 100 m.

It is an advantage of the present invention to provide a method and a system for passive target data acquisition, without emission of detectable radiations.

Moreover, the present invention allows avoiding the high cost, the weight the volume and the maintenance costs of the LRF device.

Another advantage is the presentation on display of error zone(s) due to input data inaccuracies. Furthermore, "dead zones" are detected and designated as such.

An additional advantage of the present invention is the ability of the PTAS to operate continuously, in contrast with the intermittent operation of a LRF.

Still further, there is implemented a NFP for quickly pointing to the accurate north, even though a coarse azimuth input means is used.

A further advantage is the ability of operating when handheld, and in motion, on land, sea or in the air, where motion relates to both motion of the PTAS and of the target. In other words, the system can derive accurate target data with great efficiency, both when the PTAS is in motion and when tracking a moving target.

SUMMARY

It is an object of the present invention to provide a method and a system for passive target data acquisition system (PTAS) for passively sighting a target from an observation point so as to acquire target data therefrom and associated information. Target data is for example range to the target, azimuth angle, elevation angle, and target location. Associated information is any additional information such as waypoint, altitude, and particular data. Target data and associated information shown on a display in graphic and alphanumeric representation are available for output in digital format, and ready for transmission.

It is thus an object of the present invention to provide a method using a passive target data acquisition system (PTAS) operative from an observation point for passively sighting a target. The PTAS comprises:

passive sighting means coupled to a navigation device and to azimuth and elevation angle measuring devices a computer module operatively coupled to a DTM database module, to the sighting means, and to a display.

The method comprises the steps of:

measuring location data of the observation point, and azimuth and elevation angle data to the target, and feeding measured data to the computer module and presenting on the display both the observation point and the target on a corresponding DTM surface derived from the DTM database.

The method is characterized by comprising the steps of:

directing a vector toward the target and defining an envelope surrounding the vector originating at the observation point, and an envelope mantle distanced away from the vector proportionally to errors of measurement, running a PTAS computer program on the computer module for calculating intersection points of the vector and of the envelope with the DTM surface, and presenting the intersection points and associated information on the display, whereby target data is acquired passively to avoid emission of radiations.

The method further comprising the steps of running the PTAS computer program to derive a distance separating between intersection points selected on the DTM surface, and deriving a range measurement separating the observation point from the target. Moreover, the method and system further comprise the steps of operating uninterruptedly for continuously deriving measured and calculated data, and operating uninterruptedly to continuously provide target range, target location data, and associated information.

It is a further object of the present invention to provide steps for detecting the existence of dead zone(s) distributed along the vector, between the observation point and the target, and mapping the dead zone(s) on the display. In addition, the system and method comprise feeding the PTAS computer program with selected data comprising position location, LOS vector length, azimuth and elevation angles, and running the PTAS computer module to display dead zones of terrain and associated information, according to the selected data.

It is another object of the present invention to provide sighting a target from an observation point located above the DTM surface and situated on an airborne platform on land, at sea, in the air or in space, and supported on a stabilized platform if desired.

It is yet an object of the present invention to provide a system and a method for rapidly finding accurate north direction, comprising: obtaining at least a coarse north direction reading for input into the computer module, and characterized by comprising the steps of:

running a north-finding procedure computer program on the computer module for determining an observation zone sector, dividing the observation zone into sub-sectors and defining reference targets, using an active range measuring device to actively measure range from the observation point to at least one reference target, feeding the at least one actively measured range into the computer module, and running the NFP computer program for calculating deviation in azimuth data to the at least one reference target by respectively associating range as calculated by the PTAS and range as actively measured for deriving a common azimuth deviation factor providing a correction factor for indicating the accurate north. Although reference was made to at least one reference target, two and more reference targets are preferably used.

This comprises dividing the observation zone automatically into sub-sectors, and selecting randomly one reference target in at least one sub-sector, or in each one of at least two non-adjacent sub-sectors, and defining a selected reference target as a locus for which each small azimuth deviation of the sighting vector encounters a large change in range.

The system and method further comprise the steps of:

running the NFP computer program for calculating whether adjustment of the observation point location reduces the value of the common deviation factor, and adjusting the observation point location when the accordingly calculated adjustment reduces the value of the common deviation factor.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

BEST MODES FOR CARRYING OUT THE INVENTION

Figure 1:
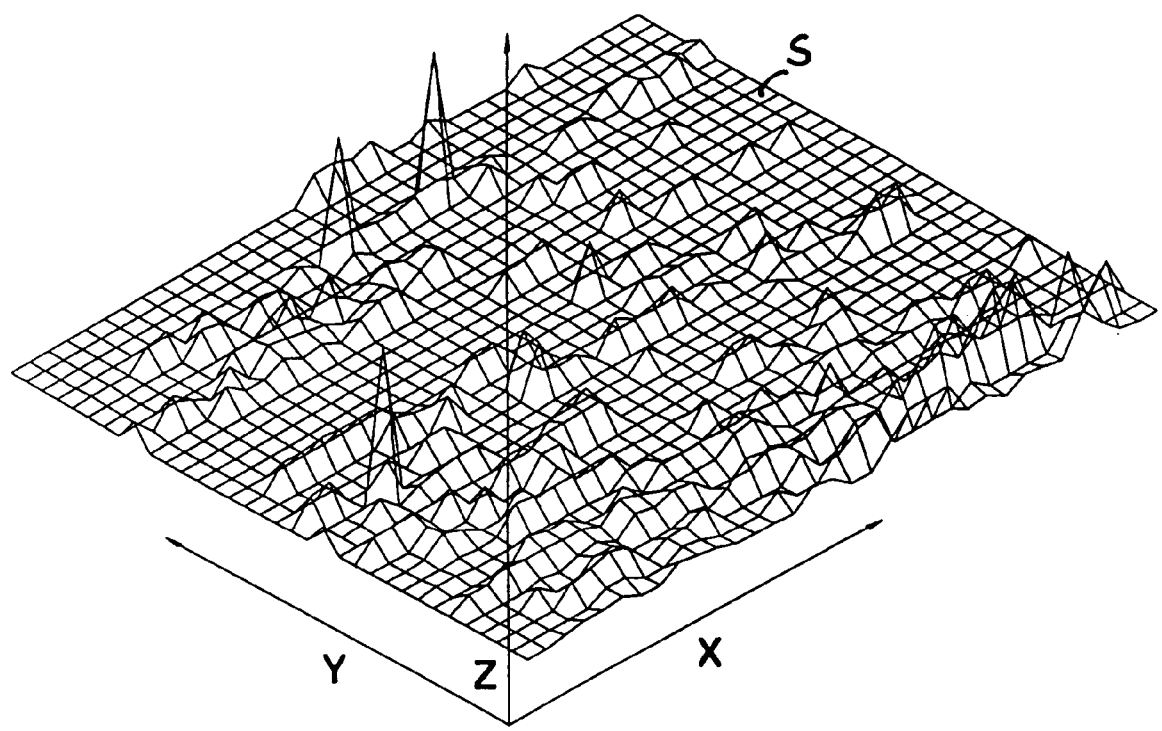
FIG. 1 is a schematic description of a DTM known in the art.
Figure 2:
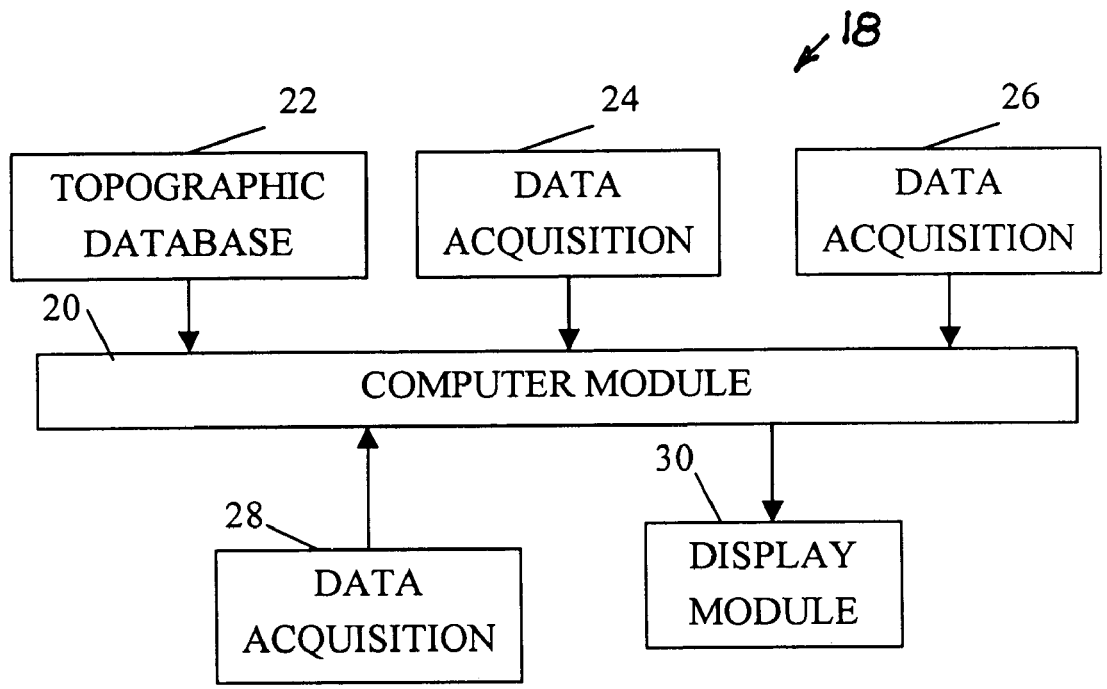
FIG. 2 is a schematic architectural scheme of a passive target data acquisition system of the PTAS.

As seen in FIG. 2 to which reference is now made, a passive target data acquisition system (PTAS) 18 of the invention contains a computer module 20, a topographical or DTM database 22, or a link to such a database, a plurality of passive data acquisition modules 24, 26 and 28, and a display module 30, or display 30. The general setup described schematically in FIG. 2 indicates the connections of the topographic database and of the acquisition modules, with the associated computer module, to which passively collected spatial data is furnished, as will be explained below. As stated above, sighting means are regarded as being inherently included but are not described since well known to the art. The terms DTM, DTM module, DTM database, topographic database are used interchangeably. A DTM surface and DTM surface contour are derived from the DTM module.

Passive data acquisition collected at the observation point contrasts with active data acquisition, which relates to radiation-emitting means. Sometimes, it is desired to conceal the location of the observation point and to avoid the emission of radiations. The advantage of passive data acquisition means is that they are practically, or at least much more difficult to detect than are active data acquisition means, which generally emit some kind of radiation, possibly detectable by other parties. Another advantage is the low cost of the system, when compared to the cost of an active range-measuring device such as an LRF.

Figure 3:
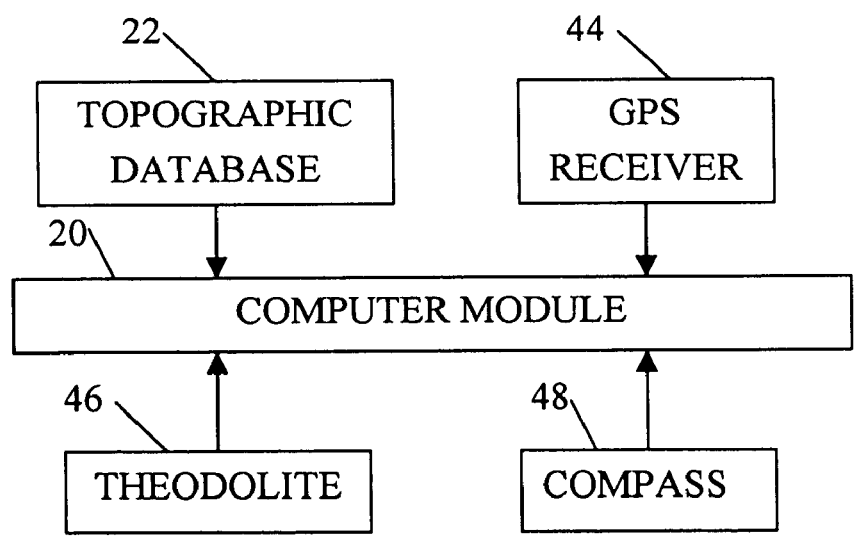
FIG. 3 is a scheme describing data flow respective to the computer module.

The PTAS locates a target in the three dimensional space defined by an existing DTM database, by use of a target data acquisition process TAP. The information obtained by the passive data acquisition modules of the PTAS is used to define the origin and the direction of a vector v. The origin of the vector v is the observation point with the PTAS, which origin location can be measured by a navigation data device, typically a GPS (Global Positioning System) receiver, as is explained with reference to FIG. 3. Typically, the computer module 20 receives location data from a navigation device or data source such as a GPS receiver 44, elevation angle to the target from a suitable measuring device, such as a theodolite 46, and azimuth angle data from an orientation measuring device, possibly a compass 48, but preferably a better-resolution orientation measuring device. The term elevation is used as a general expression regarding the measurement of an angle in a vertical plane. The elevation angle is taken as positive upward of a horizontal plane passing through the observation point, and as negative in the opposite direction.

The PTAS resides at the observation point taken as the origin of the DTM for the purpose of calculations. The operator of the PTAS is either present in situ or situated at a remote station. The vector v is the line of sight (LOS) from the observation point to the target. As already pointed out above, it is taken for granted and assumed below that the PTAS has first to be assembled, if necessary, has sighing means, is powered-up and leveled, before becoming operative.

Figure 4A:
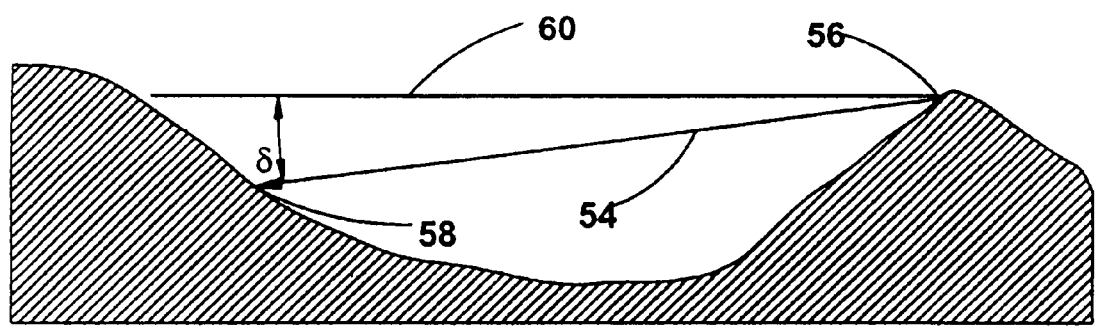
FIG. 4A is a schematic illustration of the elevation angle as measured by the system of the PTAS.
Figure 4B:
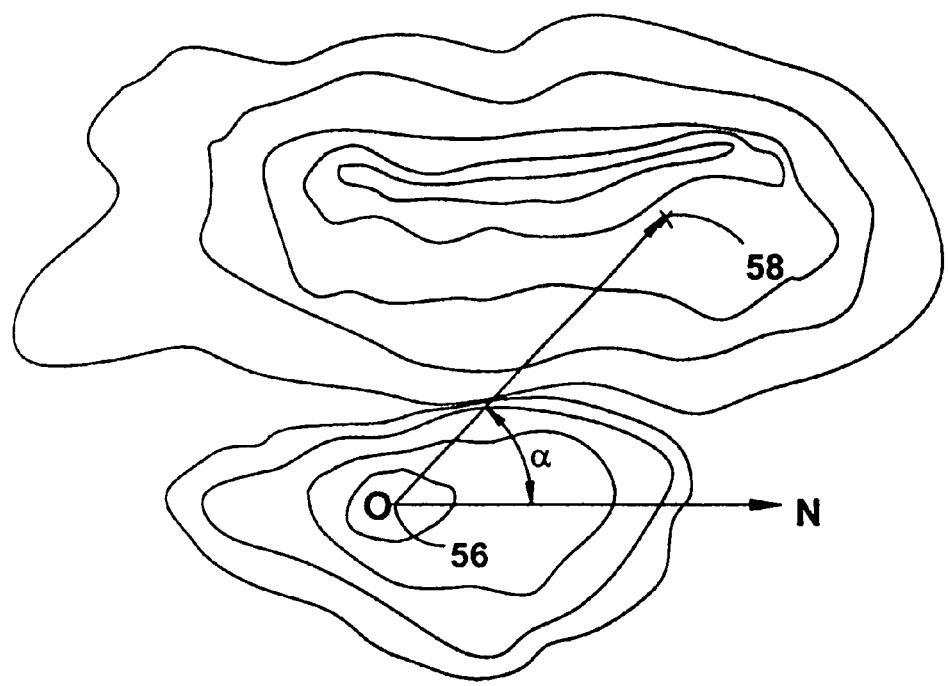
FIG. 4B is a schematic description of the azimuth angle as measured by the PTAS.

The elevation angle is illustrated in FIG. 4A to which reference is now made. FIG. 4A illustrates a cross-section cutting through the terrain model, the straight line 54, or line of sight (LOS) connecting between the observation point 56 where the PTAS resides, and the target at point 58. The straight line 54 and the horizontal line 60 form an angle δ, which is the elevation angle. The azimuth α is depicted in FIG. 4B which refers to a topographic map. Azimuth α is the angle between the north N, designated by an arrow marked N, and the LOS to the target at point 58, as seen from the observation point 56.

Once the passively obtained spatial information, namely the position, or the location, of the observation point, the elevation angle, and the azimuth angle, has been entered, the computer module can calculate the intersection point of the vector v with the DTM surface derived from the DTM database. This means: the intersection point of the vector v with the DTM contour curve of the terrain in the vertical plane wherein the vector v resides. Since the DTM is a discrete model, with a typical distance of say 10 meters between each sampling point, although the height accuracy for each sampled point is high, interpolation algorithms that are applied to define a more dense coverage of the area are accurate to only typically ±5 to 10 meters.

Bilinear or cubic algorithms can be used to calculate the interpolation points. Bilinear interpolation generates a terrain surface representation built as planar quadrilateral elements, each having one corner with a common z-coordinate of the DTM. This means that two opposite sides of the quadrilateral element are aligned with the x-axis while two other perpendicular sides thereof are co-directional with the y-axis. Cubic interpolation is achieved by casting a geometrically continuous plane atop the z-coordinates to approximate the various DTM points as closely as possible.

Figure 4C:
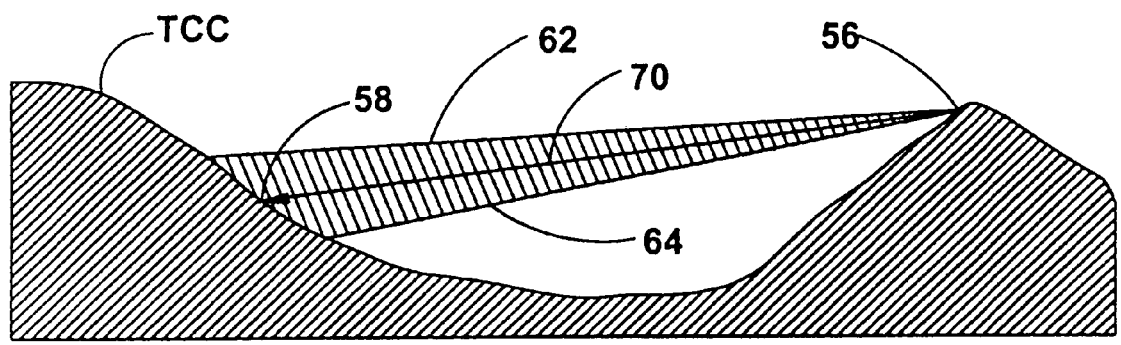
FIG. 4C is a schematic description of the imaginary envelope shown as a cone surrounding the sighting vector, demarking measurement imprecision associated with the system.

The measurement imprecisions associated with the data acquisition modules are contained within the volume of a virtual envelope surrounding the vector v. In the FIGS., the envelope is illustrated as a solid cone for the sake of simplifying the description. FIG. 4C is a side elevation of a cross-section cut in a vertical plane through the DTM surface contour, through the LOS, and thus through the cone. The smaller the errors introduced by the data acquisition modules, the sharper the vertex angle of the cone, thus the closer the mantle of the cone to the LOS. As seen in FIG. 4C, the cone is drawn in symmetry around the vector 70, or LOS, which it envelopes. Vector 70 joins between the origin O, marked as the observation point 56 supporting the vertex of the cone, and the target T designated as point 58. From the observation point 56, here the origin O of the system of coordinates of the DTM, the vector 70 points to target 58. Lines 62 and line 64 mark the, respectively, upper and lower generatrix of the cone cross-section. The envelope depicted as a cone in the Figs., intends to represent a volume contained between the lines 62 and 64. The lines 62 and 64 reside in the cone mantle, or envelope mantle, enclosing the envelope.

To locate the target, an iterative calculation process is applied, employing two pointers implemented concomitantly. A first pointer moves on the DTM, hence along the curve of the terrain surface contour itself, which is the vertical projection of the vector 70, in the vertical azimuth plane on the DTM. The first pointer starts from the projection of the origin O on the DTM, and proceeds in the direction of the measured azimuth. A second pointer moves along the vector 70. Both pointers are collinear on the vertical through the first pointer. After a number of iteration steps, both pointers meet, at the intersection of the vector 70 and of the DTM terrain contour curve, then the target T is found. This is further explained in FIG. 5 to which reference is now made.

Instead of using pointers, or an iterative intersection finding process, any other method for that same purpose is practical. For example, an entirely is analytical solution may be applied when the DTM surface is defined analytically, but any other suitable approximation method is also useful.

Figure 5:
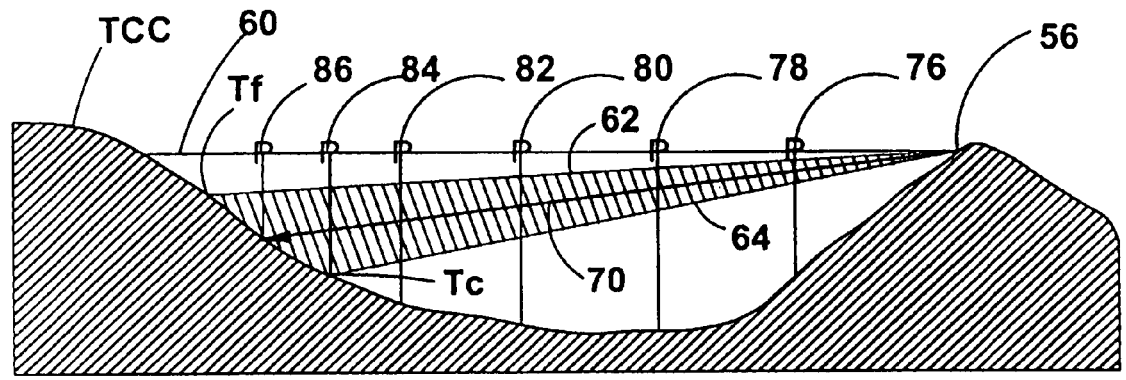
FIG. 5 is a schematic description of the geometric basis for searching intersection points as defined with the PTAS.

In FIG. 5 an imaginary point P is moved in successive iteration steps on the horizontal 60, which is oriented in the direction of the azimuth and vertically coplanar therewith. At each iteration step, a normal to the horizontal 60 passing through point P, intersects both the vector 70 and the DTM, or the terrain contour curve TCC. The first pointer Pv, not marked on FIG. 5, designates the intersection of the normal to the horizontal 60 with the vector 70, and the second pointer Pd, not indicated on FIG. 5, indicates the intersection of the normal through point P with the DTM terrain contour curve TCC of the DTM. In a first iteration step, point P is moved to location 76 on the horizontal 60. Since the vector 70 is above the DTM terrain contour curve, both pointers Pv and Pd do not meet, as they are separated by a distance along the vertical Z-axis of the DTM. The fact that both pointers Pv and Pd do not coincide, or do not match, means that the target T has not been detected. Therefore, the iteration process continues.

In a next iteration step, point P on the horizontal 60 moves from position 76 to position 78. Accordingly, Pv on vector 70, and Pd on the DTM terrain contour curve TCC, progress to a new location. Both pointers reside on the normal to the horizontal 60 through position 78. Still, no match is found, since both pointers Pv and Pd are mutually separated in vertical distance on their common normal. Likewise, a further iteration step of point P from position 78 to position 80 has the same result, since Pv and Pd do still not match. The iteration process continues in the same manner in further steps, from position 80 to position 86. The target T on vector 70 is finally found at position 86 where both Pv and Pd coincide. However, this target point is theoretical, since due to system errors, the real target may reside anywhere in an error-area circumscribed by the intersection of the cone mantle with the DTM, actually the terrain surface contour. This error-area is delimited by a target area border formed by the intersection of the mantle of the cone, or by each directrix of that mantle, with the DTM.

The horizontal 60 is used for the sake of explanation only. In fact, the pointer Pd is displaced iteratively, and the pointer Pv follows accordingly on the same vertical. The iteration steps are set to ascertain small and reasonable consecutive jumps along the DTM, thus along the terrain surface contour curve TCC of the cross-section, say in steps of each 10 cm, or as desired.

Still with reference to FIG. 5, at position 84, the lower directrix of the cone mantle, represented as line 64, will provide the target point Tc closest to the observation point 56 on the target border. The farthest target point Tf resides on line 62, which is the highest directrix of the cone. Other points on the target area border are determined by iteratively continuing the pointer-match searching process described above, for other directrix lines of the mantle of the cone. It is understood that the smaller the system errors, the smaller the error-area. Should the terrain contour be a geometric plane, then the error-area would become a geometrical cone section, thus an ellipse for a plane slant to the LOS, or vector 70.

Figure 6A:
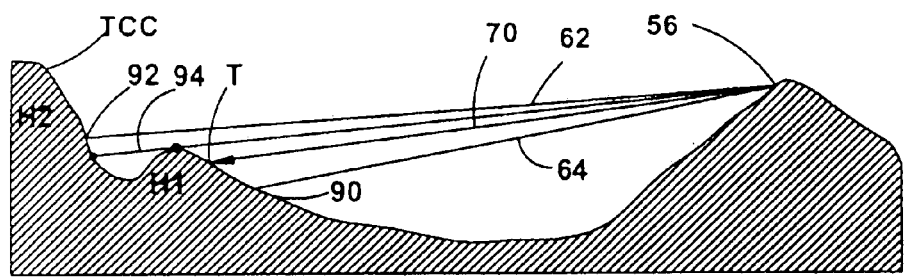
FIG. 6A is a side elevation showing two error zones.
Figure 6B:
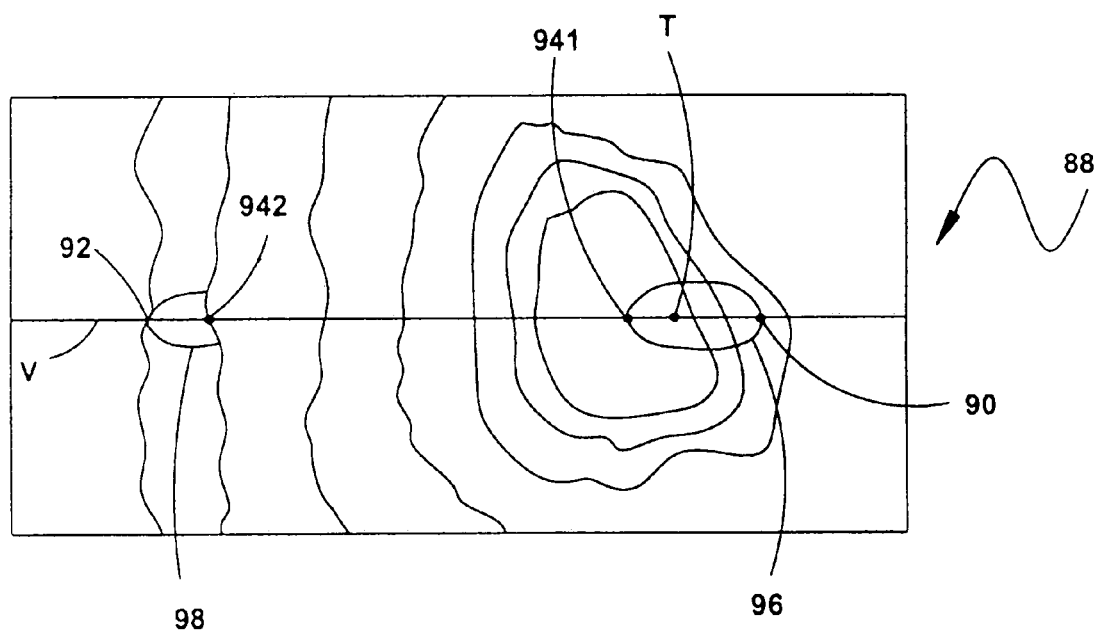
FIG. 6B is an illustration of a display showing two error zones.

In reality, the error-area is displayed to an operator on the display module in the shape of a trace, or a closed curve defining the uncertainty area wherein the target resides. However, depending on the convolutions of the DTM surface contour and of the angle of incidence of the LOS thereon, more than one closed curve may define the uncertainty area for a single target sighting. With reference to FIG. 6A, there is shown a cross-section cutting the DTM terrain surface and the cone in a vertical plane through the vector 70. The terrain contour curve TCC of the DTM terrain surface represents a meandering hilly curve with peaks and valleys. As shown in FIGS. 6A and 6B, the vector 70 will hit the first hill H1 to indicate a target T thereon, while the lower and the upper generatrices, respectively 64 and 62, intersects the terrain contour curve TCC at point, respectively 90 and 92. Point 90 and point 92 reside on, respectively, the forefront first hill H1 and a background second hill H2. The vector 94 is asymptotic to the top of hill H1 at point 941 and hits hill H2 at point 942. The area of uncertainty as defined by the cone will delimit a first error-area 96 on that first hill H1, up to the top thereof, and also a second error-area 98 on the second hill H2.

It is taken for granted in the description below that reference to displayed information, such as the display of error-area(s) refers to both graphical and numerical data, and likewise to associated information related thereto, and that the operator may select to view both or only either graphical or numerical data. To receive data relative to any point selected on the display, the operator uses the I/O unit accepted as being available as standard equipment with sighting devices.

Still with reference to FIGS. 6A and 6B, it is thus possible to passively sight a single target and to obtain in response more than one uncertainty area. In such case, a plurality of separate uncertainty areas is displayed to the operator on the display module, all as traces or closed curves aligned along the direction of the vector v, or LOS. The topography of the DTM shown in FIG. 6A is depicted as a top elevation in FIG. 6B, which represents the display 88 as appearing to the operator. The target T is indicated on hill H1 but the uncertainty area covers a first patch 96 on that hill, and a second patch 98 on hill H2. FIG. 6B illustrates more than one mutually separated uncertainty area, which is indicative of a "dead zone" between each couple of uncertainty areas. Although not shown in the various Figs., numerical data, or associated information related to the graphical information is also shown to the operator. It is taken for granted in the description that reference to a display, or presentation on display, refers to both graphical and numerical data, or associated information related thereto, and that the operator may select to view both or only either graphical or numerical data.

A dead zone is defined as a region of terrain hidden from the view of an operator when sighting the target along the LOS. It is to the operator to decide in which uncertainty area the target may reside. The existence of a dead zone is considered as valuable information unveiling the presence of hidden areas. For the benefit of the operator, the PTAS differentiates between a cone mantle intersection delimiting an error-zone and a vector v intersection indicating the target, and emphasizes this distinction on display.

Returning now to system inaccuracies, it is realized that the measurement imprecisions in elevation and in azimuth are different in value, thus bound by an envelope in the shape of a four-sided pyramid. A section therethrough, normal to the LOS, will rather show as a rectangle and not as a circular base, in the case of a straight cone as used for ease of description. In fact, the term envelope is used as a generic name for a three-dimensional shape with an apex at the observation point, possibly divergent toward the target, but proportional to measurement inaccuracy, and enveloping the LOS along its length. For example, a four-sided pyramid, not necessarily square, may typify inaccuracy in azimuth and in elevation. In reality, for the general case of an envelope, a cross section perpendicular to the LOS vector will provide a shape enclosed within borders. These borders represent the mantle, or exterior surface of the envelope. Each point on the cross-section is better defined in polar coordinates. With the origin on the LOS vector, a radius vector and an angle define each single point on the cross-section of the envelope.

The iterative target search process is not ended when a first target is reached, but is set to continue along the same vector v and cone mantle directrices, until a vector length end is reached. This vector length is set a priory by the operator, for example, as 10 km.

In practice, not only the intersection points with the DTM are valuable, but also the surface they delimit, as well as the distance between the delimited surfaces. The first created intersection point is that of the vector v piercing the DTM, and designating a target point. When the contour of the DTM presents a succession of aligned hills along the vector v, then, vector v may intersect the DTM at more than one single point. One of those intersection points is the target. Other intersection points with the DTM are those of the mantle of the envelope, which intersection points delimit an uncertainty area. Each intersection point of the vector v with the DTM is accompanied by an uncertainty area, one of which surrounds the target. There is thus always one target, but possibly more than one uncertainty zone. It is the separation between the uncertainty areas, thus the distance between the delimited surfaces that indicate the presence of dead zones. The detection of dead zones is very often of cardinal importance, for example in rescue operations, in civil engineering, and in warfare.

Figure 7:
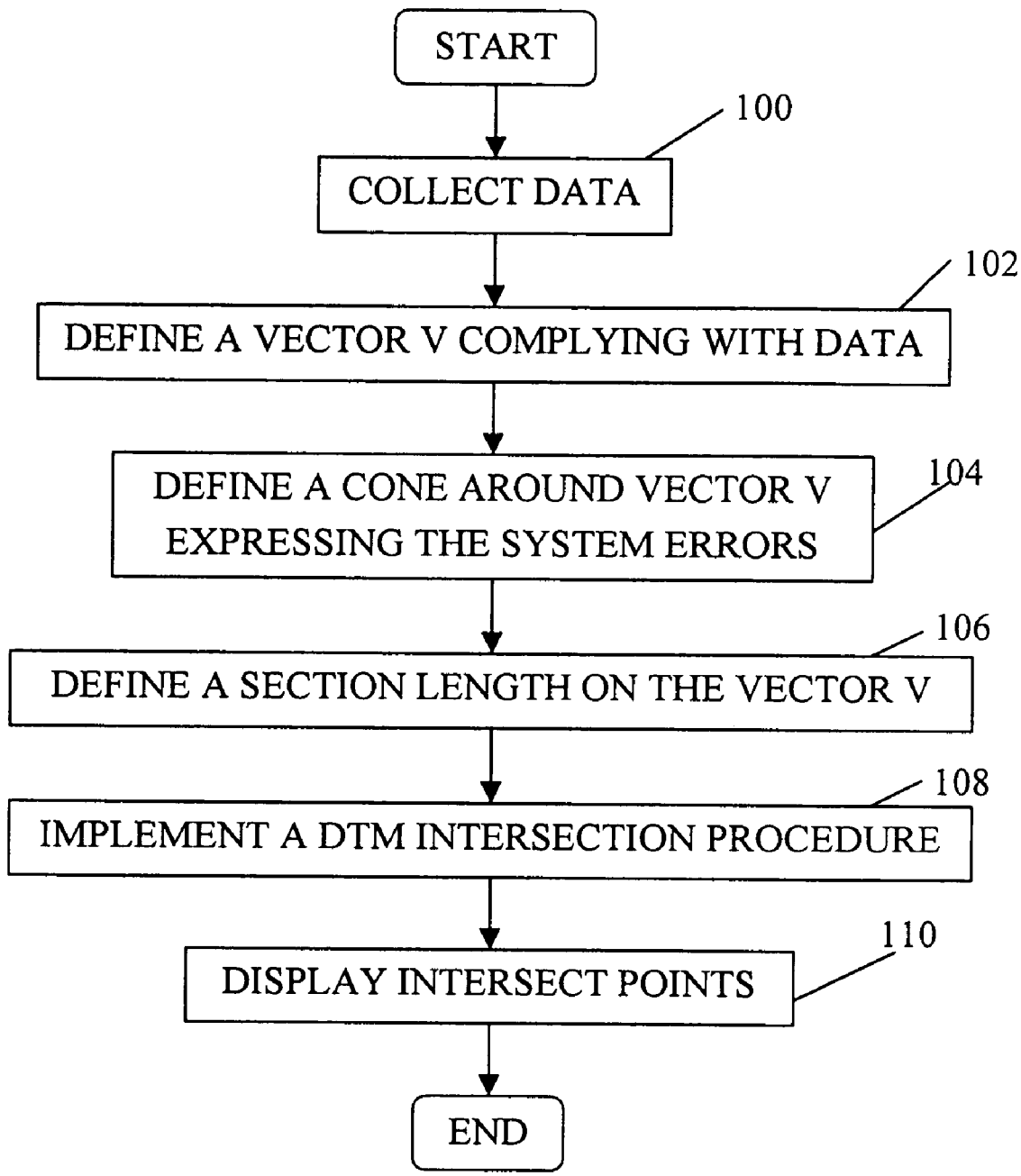
FIG. 7 is a flow diagram of the succession of steps by which the passive target data acquisition of the invention is performed.

The entire process of passive target acquisition in accordance with the present invention is described schematically in FIG. 7 to which reference is now made. In step 100 data is collected, including azimuth and elevation angle to the target, and position of the observation point on the DTM. Reference to an observation point located above the DTM, such as for an airborne platform, is made below. At step 102 a vector v is defined as having an origin at the observation point and a direction as defined by the azimuth and elevation angle. At step 104 a cone, for the sake of simplicity, is defined having a vertex at the observation point, and a vertex angle corresponding to the errors of the system, in relation to the data acquisition modules. At step 106 the operator defines a maximal section length on the vector v to be searched for intersection with the DTM. The maximal section length is defined once only, at the beginning of the setup, for example, as 10 km long. At step 108 the iterative DTM intersection finding procedure is implemented. The intersection points, LOS vector point and cone mantle points are found and displayed on the display module, for inspection by the operator, in step 110.

Figure 8:
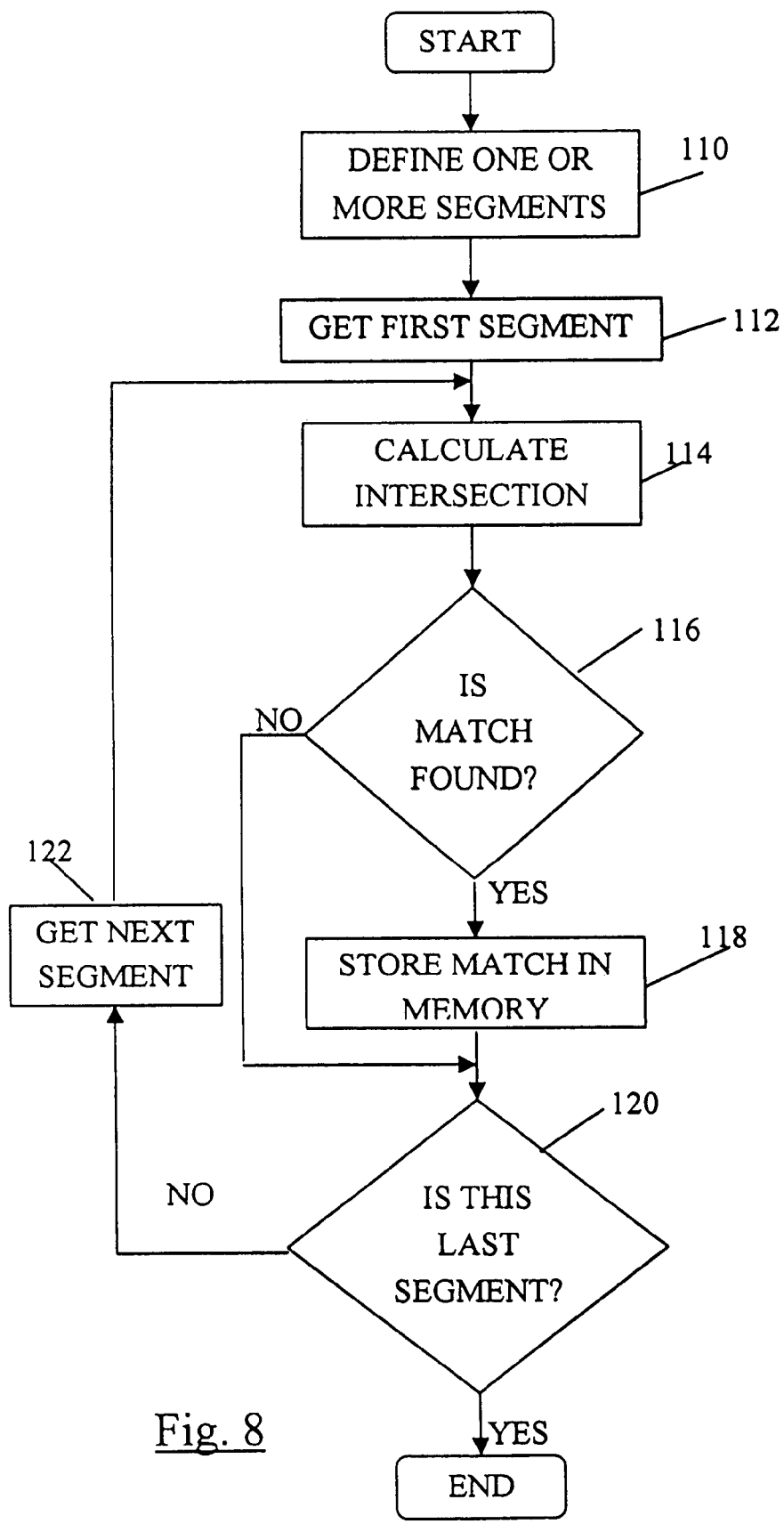
FIG. 8 is a flow diagram of the DTM surface intersection procedure.

The DTM intersection procedure is described schematically in FIG. 8 to which reference is now made. In step 110 the allocated section is divided into segments. The first segment is selected in step 112. If desired, there is only but one single segment. Next, in step 114, intersection calculations are performed on the first segment, to find matches, or coincidences between the pointers on the vector line and on the generatrix of the cone envelope relative to the pointer on the DTM. Then, in step 116, the system tests for the finding of at least one match between pointers. If not found, control passes to step 120. If a match is found, then, by step 118, the at least one match point is stored in memory and control flows to step 120. Should this be the last segment, or the only single segment, then the procedure is ended. Else, in step 122 a next segment is fetched. Control returns to step 114, and calculations are carried out for the next segment in search for a possible match between both pointers. If desired, the whole predetermined length of vector v is considered as one single segment. In other words, the first and only segment is the maximal section length on the vector v to be searched for intersection with the DTM. This approach has its advantages.

It is understood that coincidence or match of the pointers Pd and Pv is accepted to exist when their mutual vertical distance lies between preset tolerances. For example, even when a few centimeters still separate between both pointers, such a small discrepancy may be considered as a coincidence of pointers, thus as achieving a valid match of pointers.

In general, when reference is made below to a match or coincidence, there is considered a range of tolerance, since in real life there is no advantage to require perfect mathematical exactitude.

The PTAS computer program is also a powerful tool enabling to discover and map dead zones of terrain while in the planning stage of a mission, well before actual execution. To this end the computer program of the PTAS is fed with data related to a selected region to be scanned, and run to display the results. An operator may enter a waypoint of a planned observation point, define a LOS vector length, and then select a region to be searched by defining the azimuth and elevation angles as parameters. As a most simple example, when a single azimuth and a single elevation angle are entered, then dead zones along only that LOS vector are calculated and displayed. To obtain information about a longitudinal section through the terrain along one vertical azimuth plane, the same calculations are repeated but for a succession of elevation angles within given limits. To cover an area of terrain, both azimuth and elevation parameters are entered as variables, within a chosen range of angles. Other combinations of observation point position, LOS vector length, elevation, and azimuth angle will serves numerous additional purposes.

The observation point from which the PTAS is operated is not necessarily a static position, but if desired, is possibly a mobile position. The PTAS is preferably mounted on a stabilized platform when implemented as a device operated on a vehicle in motion. In general, the PTAS is compatible for use on a platform, static or mobile, on land, at sea, in the air or in space. When built according to present art practice, and when integrated with existing systems, the PTAS is not larger than a small handheld camera, which renders it practical for assembly with handheld personal binoculars and weapons, and with unmanned airborne vehicles.

When operated from a mobile platform, such as from an unmanned airborne vehicle, additional data input and computer programs are necessary to take into account the path or trajectory of the platform, and the spatial attitude movements of the platform.

North Finding Procedure (NFP)

The capabilities of the PTAS and the implementation of the Target Data Acquisition Process, or TAP, may be used for an additional purpose. In a linked process, a rapid north-finding procedure (NFP) is implemented by using the PTAS described hereinabove in association with an active range finder, typically a laser range finder LRF. The system is used for perfecting a rough north measurement, such as obtained by a magnetic compass, to an enhanced high-precision north indication. The NFP uses sightings to reference targets RT, associating both passively calculated range and actively measured range to compute a common angular correction factor, and rapidly obtain an accurate north reading at the site of the observation point.

Figure 9:
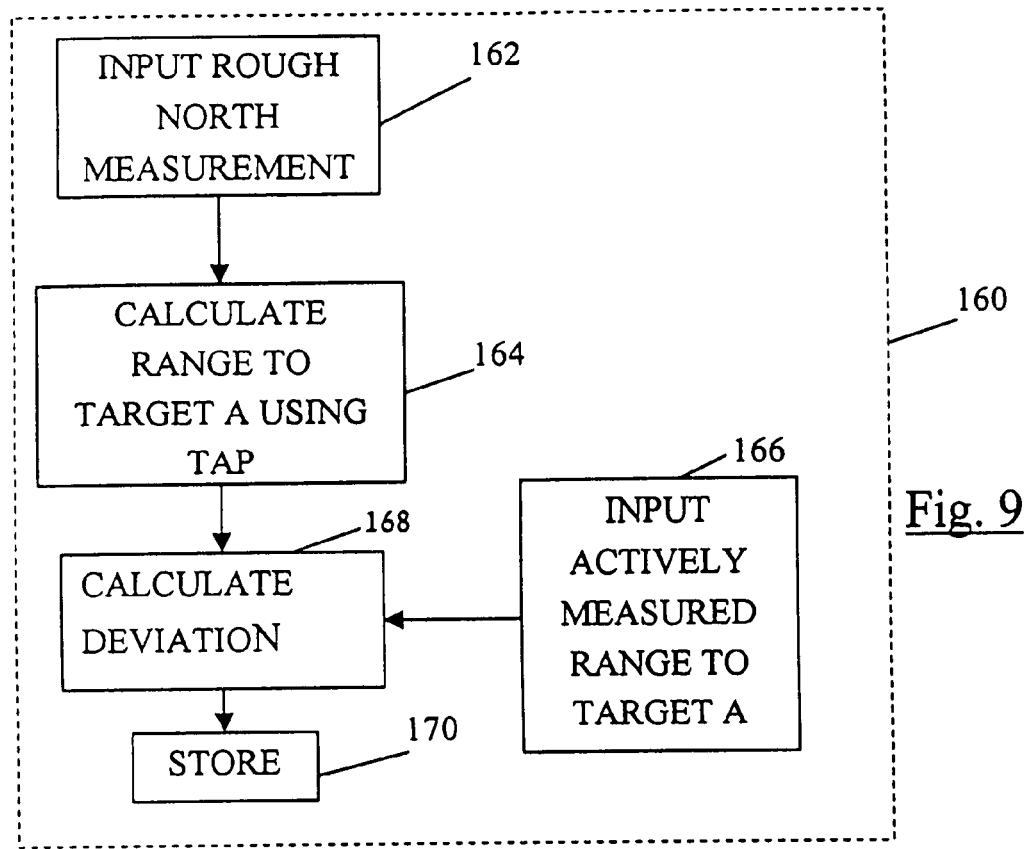
FIG. 9 illustrates a procedure for defining an accurate north procedure.

To begin with, the NFP uses a data input procedure (DIP) as explained below, with reference to FIG. 9. The DIP 160 accepts the input of a rough north measurement at step 162. The target data acquisition process, or TAP, is then operated to calculate the range, or the distance to a reference target A as defined by the operator in step 164. At step 166 the DIP accepts the input of an actively measured range to the reference target A, as measured by help of a laser range finder LRF. At step 168, the deviation between the range calculated by the TAP and the range measured by the LRF is used to calculate a common azimuth correction factor. To that end, an observation zone sector is defined and divided in sub-sectors. Selected sub-sectors are scanned to detect a match between the calculated and the actively measured range to a reference target A, or RT A. As explained below in detail, for each range-match found, the TAP calculates the angular deviation separating the azimuth to the RT A and the azimuth to a location with a matching range. The derived angular deviation is stored in step 170. The DIP is repeated several times for different selected reference targets A chosen in different predetermined sub-sectors. However, the NFP operates well even with a single RT A.

Figure 10:
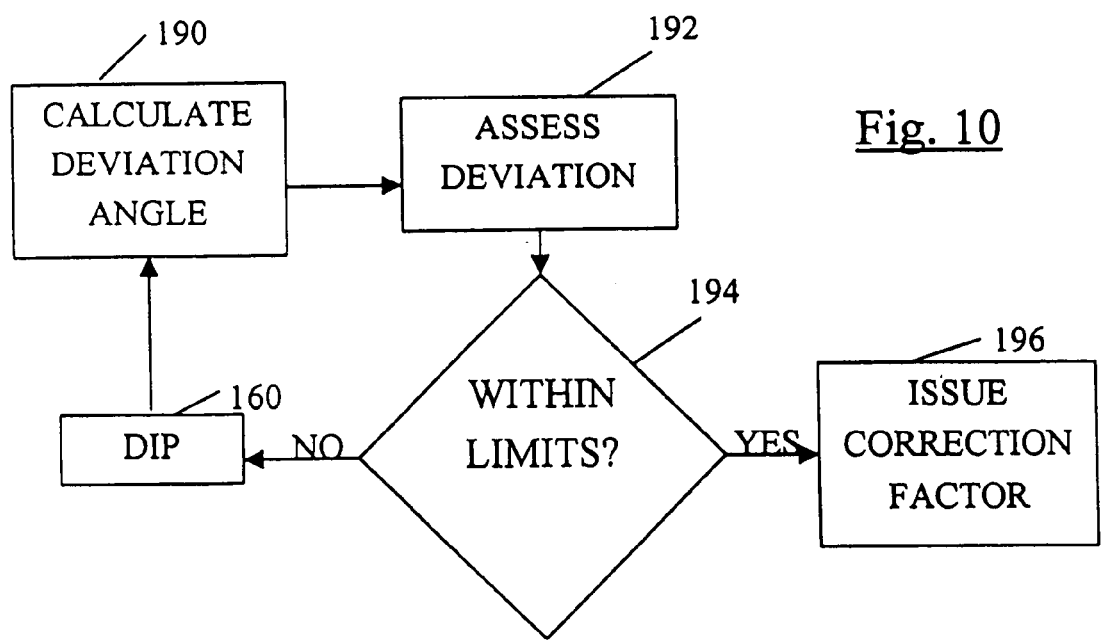
FIG. 10 presents steps for assessing deviations with respect to selected reference targets.

In the procedure described in FIG. 10 to which reference is now made, a common deviations factor for the several selected reference targets A is calculated in step 190. Once collected, the deviations are assessed in step 192. This is accomplished for example by defining a permitted tolerance, and declaring a match to be valid when the ranges are within tolerance limits, as in step 194. It was already stated above that matching or coinciding relate to a practical predetermined range of tolerances, and is not mathematically absolute.

If the calculated common deviation factor is found and is within tolerances, then a correction factor is produced to establish the accurate north, in step 196. Should a common deviation factor not be found, then the DIP is reactivated and operated on a new set of reference targets chosen in differently predetermined but not adjacent sub-sectors.

Figure 11:
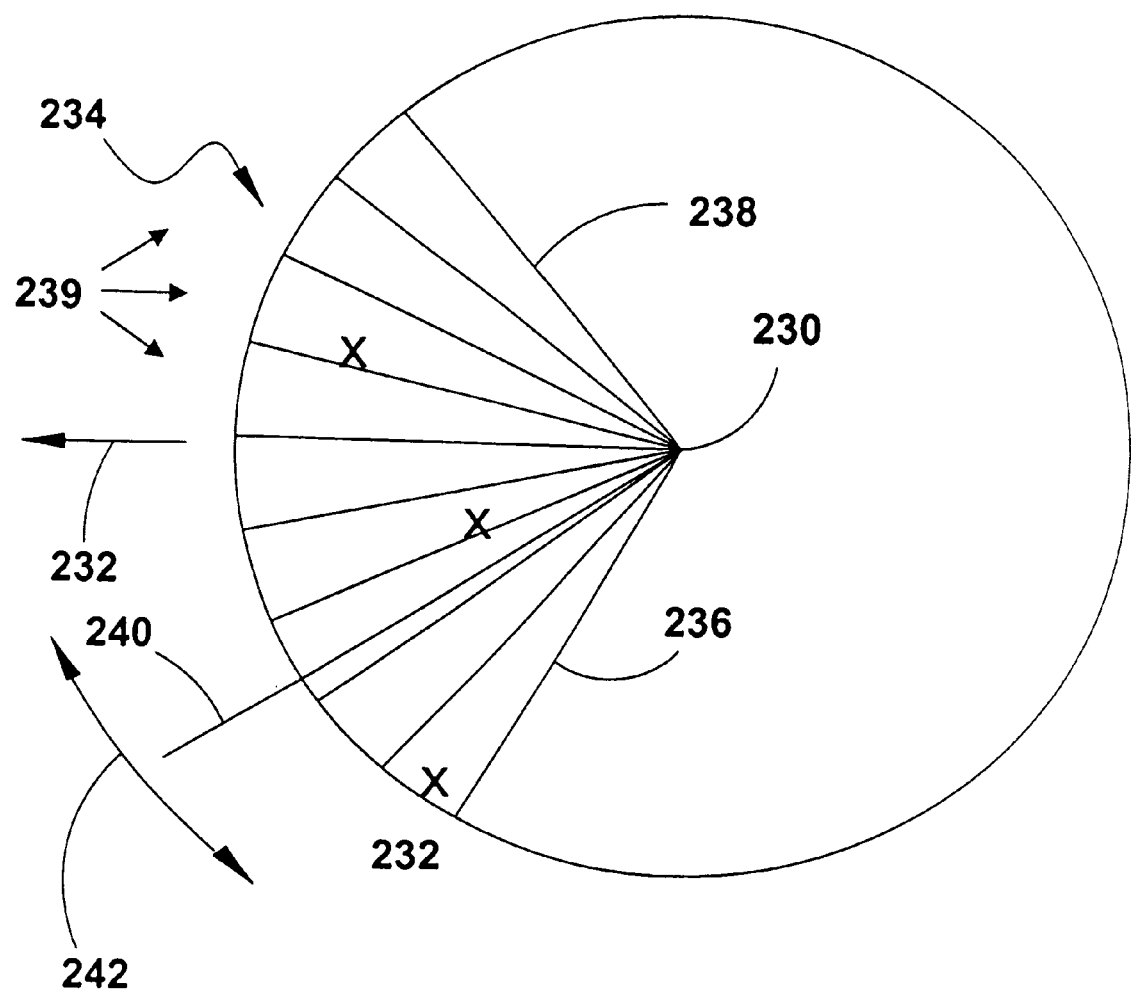
FIG. 11 depicts a scenario for reference target selection.

The system of the invention searches the DTM and selects the optimal reference targets so as to achieve the best possible accuracy enhancement. The overall scenario of reference target selection is described according to FIG. 11 to which reference is now made. The PTAS observation facility at point 230 looks roughly in the direction of arrow 232. The area of interest is assigned an observation zone sector 234 having two radii as zone limits, 236 and 238, respectively. Then, the observation zone sector is divided into several sub-sectors 239, typically 10, by a procedure possibly carried out automatically by the computer module of the TAS, or by the operator. Within each sub-sector 239, the DTM is searched for one singular reference target (RT), each being defined as a locus. Such a locus is a site where each small angular movement of a radial cursor 240, in sector 234, in the direction transverse to the azimuth, as depicted by the double-headed arrow 242, encounters large changes in range. Typically, the sub-sectors 239 in which a RTs are selected are spaced apart and not adjacent, as highlighted by the X marks within the sector 234. When desired, the NFP is operated with only one singular reference target RT, although usually three RTs in non-adjacent sub-sectors 239 are preferred.

To operate the NFP, there is needed a PTAS as described above, an NFP computer program running on the computer module, and an active range measurement device such as a LRF. It was described above that the PTAS is operative independently, but this is not true for the NFP, which requires the support of the PTAS to function.

Figure 12:
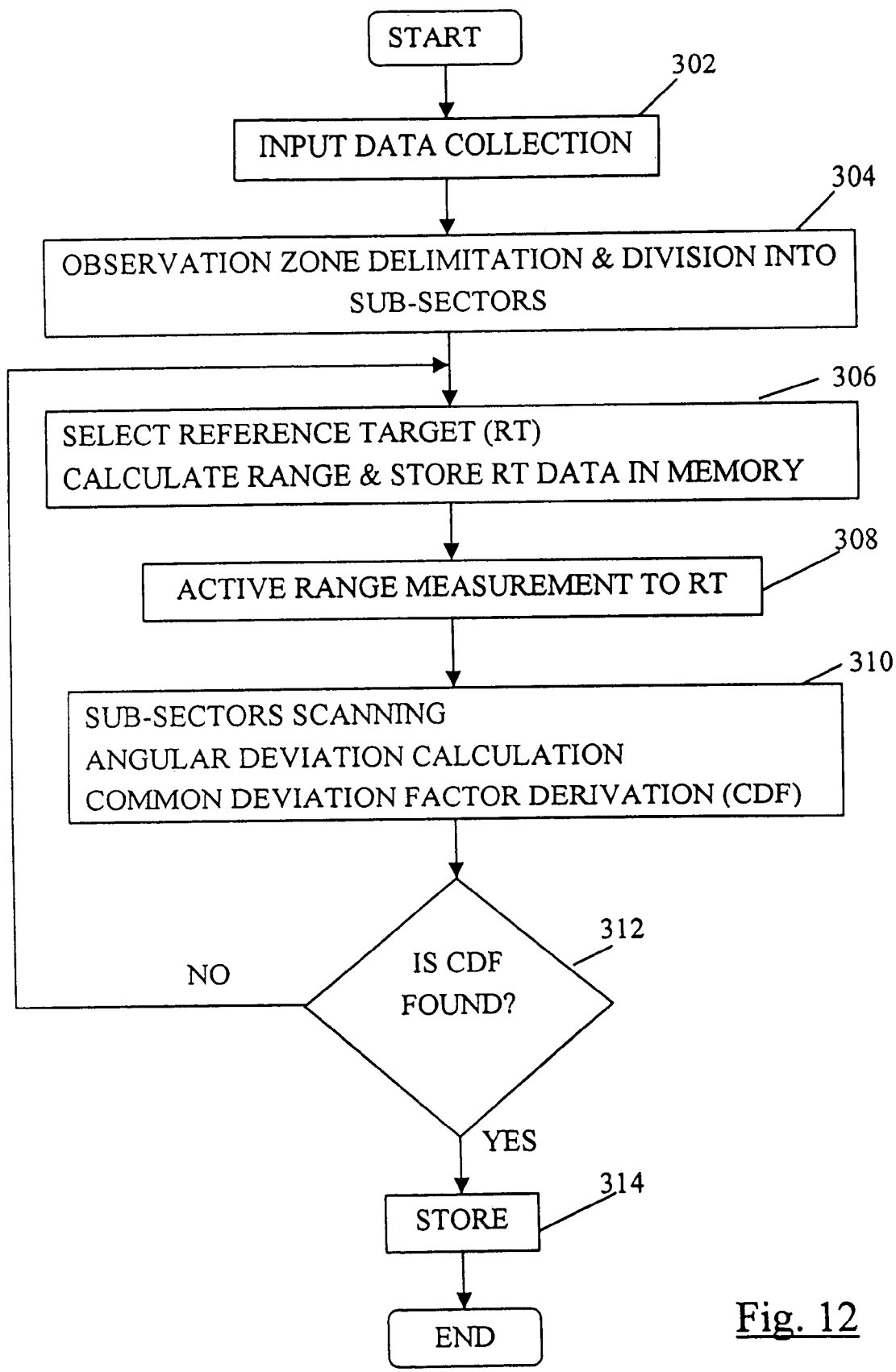
FIG. 12 is a detailed flow diagram of an accurate north finding procedure.

With reference to FIG. 12, input data is collected in step 302, including the position of the observation point, and the azimuth. Typically, those input data are obtained as follows. For the location of the observation point, which is regarded as the origin of the Cartesian set of coordinates on the DTM, a GPS (Global Positioning System) device is practical. As to the azimuth, a compass or a similar device provides the necessary indication, to a rough but sufficient accuracy of some of ±10 mills. Optionally, input is received from other sources.

Then, in step 304, it is to the operator to delimit the observation zone sector on the DTM, as described above with reference to FIG. 11. Should the operator not do so, then the NFP will automatically set a default observation zone sector to 360°. Delimitation of the sector is achieved by defining a sector radius, as the maximal observation distance, and by setting radial limits. The operator, or the computer module, will divide the observation zone sector 234 into sub-sectors 239 typically ten.

In step 306, the computer program of the NFP now searches the DTM to select a singular reference target RT in say three non-adjacent sub-sectors. Such a singular RT is a locus typified by a sharp change in range for a small angular deviation in azimuth. The PTAS now calculates RT data for each singular RT, i.e. the calculated range, elevation, and azimuth, which RT calculated data is stored in memory. More precisely, the PTAS calculates data for RTs in each sub-sector 239 and stores that data in memory. Then, in step 306, three sub-sectors are chosen at random, and one RT is selected in each one of the tree sub-sectors.

In turn, in step 308, the range to each RT is now measured, this time actively with an LRF, and stored in memory in association with the respective RT. LRF measurement is taken by sequentially pointing the sighting device at each RT. However, the operator is not aware of the location of any RT on the real life terrain as seen from the observation point, and thus needs guidance, which is possibly provided in at least two different manners. The azimuth and elevation needed to point the LRF toward the RT, which were derived in step 306, are now put to use to guide the operator. As a first manner, arrows on the display are pointing toward the required direction of sighting to guide the operator who will train the instrument until a feedback signal indicates "on target". At that point, the operator will "fire" the LRF and obtain a range. This sequence is repeated for each RT. A second manner exploits drive gears integral to the sighting device to take care of automatically sighting the instrument, and positioning the crosshairs on the RT, and then, when "on target", signal to the operator to actively measure the range. Alternatively, active range measurement is performed automatically. Again, this sequence is repeated for each RT. Each LRF reading is stored in association with the respective RT.

The guidance given to the operator for pointing to the RT as calculated by the PTAS with respect to the inaccurate azimuth indication will result in a specific accurate LRF range measurement. However, since the azimuth is not accurate, the LRF measurement, although accurate, will not relate to the RT but to another location, in a close-by direction.

Up to now, the NFP has stored passively calculated as well as actively measured ranges to RTs, as based on a rough north indication, which is certainly not the accurate precise north direction. Most probably, the passively calculated range and the actively measured range will provide different values. This discrepancy results from the fact that the computer program regards the azimuth as an absolute precise one, while in reality this is but a rough and inaccurate azimuth, which was measured with say, the help of a compass.

It is now the task of the computer module of the PTAS to find out by how much the LRF reading missed the RT by angularly adjusting the discrepancy of the coarsely measured azimuth with the accurate north. If advantageous to reduce the value of the angular discrepancy, the origin of the coordinates on the DTM may be relocated within limits.

In step 310, the NFP operates the PTAS to scan the sub-sector 239 containing a selected reference target RT, through a typical angle of inaccuracy of some ±10 mills, which is the angle of inaccuracy of the compass. The scan is conducted transversely to the direction of each computed RT. What the NFP is searching is to discover the angular deviation between a calculated point on the DTM surface, which has the same range readings as that of the LFR. Thus, when a match is found where the actively measured range to a RT coincides with a point in the respective sub-sector 239 on the DTM, the angular deviation between the azimuths to the RT as actively sighted and as calculated is saved in memory. More precisely, it is the angle between the azimuth of a point on the DTM surface, which has the same range as the one actively measured by the LRF, and the original coarsely read azimuth to the RT that is calculated by the PTAS. Then, the NFP will repeat this operation for each RT and at the end, try to find a common azimuth deviation factor, or CDF. When applied in succession to each RT, the CDF will provide a common correction factor by which the coarse azimuth indication has to be adjusted to indicate the accurate north direction.

In step 310 the transverse scan operation is repeated for each RT in the three separated non-adjacent sub-sectors. A CDF is searched for in step 312, and if found, it is stored, as by step 314, and used for adjustment.

If desired, to obtain better accuracy, after derivation of a CDF, the NFP also may also check whether corrections, within predetermined limits, of the input data regarding the observation point location, will help to obtain a reduced CDF value. Should this be the case, then the location of the observation point is also corrected. This last optional step is not detailed in FIG. 12.

Once a CDF is found, the NFP then comes to an end. As described above, matching is accepted as such within predetermined tolerances.

Should a CDF not be found in step 312, then control return to step 306, where another different set of three separated non-adjacent sub-sectors is selected, and an RT is chosen in each sub-sector. In the field, the NFP usually determines a CDF in a single search loop, but two or more CDF calculation loops are possible for difficult conditions.

The second method called super-rapid north finding - the SRNF, enables the operator to quickly find the accurate north in relation with a real-life specific sighted target, or SST, also detected on the display of the PTAS. Thereby, the operator may manually correct calculated target data to match accurate data provided by the DTM.

First the operator chooses a specific sighted target SST on the real life terrain surrounding the observation position, and measures a coarse azimuth thereto, with a compass for example. Then the operator trains the sighting or observation device of the PTAS (or sighting means, possibly binoculars or a telescope), to aim at the SST and measure observation point location and elevation angle, which, together with the coarse azimuth reading, are fed into the PTAS computer program for calculation and display. Due to the coarse compass readings, the calculated data for the SST is not accurate and the results of the calculations are referred to as a coarsely calculated target (CCT). The display of the PTAS thus presents not the sighted specific target, or SST, but the coarsely calculated target (CCT). The same display also shows the SST somewhere on the DTM surface, probably near the CCT.

It is now to the operator to search and find the specific sighted target SST on the DTM surface shown on the display of the PTAS, and to obtain therefrom the accurate azimuth to the SST. Probably, the SST will be found on the display near the CCT. When the SST is found on the display, the calculated CCT data are corrected according to the accurate azimuth of the SST, which is fed into the computer module of the PTAS.

For those cases when the operator is able to immediately identify the SST on the display of the PTAS, the process of obtaining accurate azimuth to the SST is even simpler. The operator just points the PTAS at the SST, measures the observation point location, and finds the SST on the display of the PTAS wherefrom the accurate azimuth is retrieved. At this stage the operator, or an automatic procedure, feeds-back the accurate azimuth to the PTAS.

Not only is the need for an LRF saved, but the method described above may require just only some 30 seconds.

INDUSTRIAL APPLICABILITY

The description above leaves no doubt as to the applicability of the invention in various branches of industry.

It will be appreciated by persons skilled in the art, that the present invention is not limited to what has been particularly shown and described hereinabove. For example, various devices or data sources may possibly be used to provide input to the PTAS and to the NFP. Furthermore, the PTAS is possibly acquired as readily available equipment, or assembled to integrate the various modules necessary to operate the invention. Still another possibility is to add and integrate with existing systems, those missing modules, which are necessary for the operation of the invention. Separate modules may be integrated to form a sighting system. For example, one may couple and integrate a bare sighting system to a computer, to a display, to a GPS unit, to a compass, and to a laser range finder (LRF). When all the necessary modules are present on an already existing platform, then all there is needed to implement the PTAS method and system is the integration of the computer application programs with the computer module. It is understood that manual and visual tasks may be achieved automatically. This regards for example to the visual detection of a target that may also be detected automatically by use, typically, of image processing means. Rather, the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A method using a passive target data acquisition system (PTAS) operative from an observation point for passively sighting a target, the PTAS having:

passive sighting means coupled to a navigation device and to azimuth and elevation angle measuring devices, a computer module operatively coupled sighting means, and to a display, to a digital terrain model DTM database, to the the method comprising the steps of:

measuring location data of the observation point, and azimuth and elevation angle data to the target, and feeding measured data to the computer module and presenting on the display both the observation point and the target on a corresponding DTM surface derived from the DTM database, the method comprising the steps of:

directing a vector toward the target and defining an envelope surrounding the vector originating at the observation point, and an envelope mantle distanced away from the vector proportionally to errors of measurement, running a PTAS computer program on the computer module for calculating intersection points of the vector and of the envelope with the DTM surface, and presenting the intersection points and associated information on the display, whereby target data is acquired passively to avoid emission of radiations.

2. The method according to claim 1, including:
running the PTAS computer program to derive a distance separating between intersection points selected on the DTM surface, and
deriving a range measurement separating the observation point from the target.

3. The method according to claim 1, including:
running the PTAS computer program for deriving target data including target range and target location.

4. The method according to claim 1, including:
operating uninterruptedly for continuously deriving measured and calculated data, and
operating uninterruptedly to continuously provide target range, target location data, and associated information.

5. The method according to claim 1, including:
detecting existence of dead zone(s) distributed along the vector, between the observation point and the target, and
mapping the dead zone(s) on the display.

6. The method according to claim 1, including: feeding the PTAS computer program with selected data including position location, line of sight (LOS) vector length, azimuth and elevation angles, and running the PTAS computer module according to the selected data to display dead zone(s) of terrain and associated information.

7. The method according to claim 1, including:
sighting a target from an observation point located above the DTM surface and disposed on either one of both an airborne platform and a space-borne platform.

8. The method according to claim 1, including:
sighting a target from an observation point disposed on either one of both a land-base platform and a sea-borne platform.

9. The method according to claim 1, including:
supporting the PTAS on a stabilized platform.

10. The method according to claim 1, wherein:
measured data and associated information are available for output in digital format, and
displayed data and associated information are retrievable from the display.

11. The method according to claim 1, for rapidly finding accurate north direction, including:
obtaining at least a coarse north direction reading for input into the computer module,
running a north-finding procedure (NFP) computer program on the computer module for determining an observation zone sector, dividing the observation zone into sub-sectors and defining reference targets,
using an active range measuring device to actively measure range from the observation point to at least two reference targets,
feeding the at least two actively measured ranges into the computer module, and
running the NFP computer program for calculating deviation in azimuth data to the at least two reference targets by respectively associating range as calculated by the PTAS and range as actively measured for deriving a common azimuth deviation factor providing a correction factor for indicating the accurate north.

12. The method according to claim 11, including:
selecting randomly either one of both, one reference target in at least one sub-sector, and one reference target in each one of at least two non-adjacent sub-sectors.

13. The method according to claim 11, wherein running the NFP computer program includes:
dividing the observation zone automatically into sub-sectors, and
defining a selected reference target as a locus for which each small azimuth deviation of the sighting vector encounters a large change in range.

14. The method according to claim 11, including:
running the NFP computer program for calculating whether adjustment of the observation point location reduces the value of the common deviation factor, and
adjusting the observation point location when the accordingly calculated adjustment reduces the value of the common deviation factor.

15. The method according to claim 1, for rapidly finding accurate north direction, including:
obtaining at least a coarse north direction reading for input into the computer module,
running a north-finding procedure (NFP) computer program on the computer module for determining an observation zone, dividing the observation zone in sub-sectors and defining reference targets,
using an active range measuring device to actively measure range from the observation point to at least one reference target,
feeding the at least one actively measured range into the computer module, and
running the NFP computer program for calculating deviation in azimuth data to the at least one reference target by associating range to the reference target as calculated by the PTAS, and range as actively measured, for deriving an azimuth deviation factor providing a correction factor for indicating the accurate north.

16. The method according to claim 1, for passive super-rapid finding of accurate north direction, including:
defining a specific sighted target on the terrain surrounding the observation point and taking a coarse azimuth data reading thereto,
measuring location of the observation point, and both azimuth and elevation angle data to the specific sighted target, and feeding measured data as input data into the computer module,
running the PTAS computer program for calculating with input data and displaying results on the DTM surface as a coarsely calculated target,
finding the sighted singular target on the display, and reading specific sighted target data as accurate azimuth from the DTM surface, and
adjusting the coarsely calculated target azimuth with the accurate azimuth, which is fed to the computer module, for deriving an azimuth deviation factor providing a correction factor for indicating the accurate north.

17. A passive target data acquisition system (PTAS) positioned and operative at an observation point for passively sighting a target along a LOS vector, including:
- passive sighting means comprising a navigation device for measuring location data of the observation point, and azimuth and elevation angle measuring devices for measuring azimuth and elevation angle data to the target,
- a computer module operatively coupled to a DTM module, to the sighting means, and to a display, the computer module receiving measured location of the observation point and angular data of the target for presentation on display of a corresponding DTM surface derived from the DTM module, the PTAS comprising:
- an envelope radially surrounding the LOS vector length which originates at the observation point, and an envelope mantle distanced away from the LOS vector proportionally to errors of measurement,
- a PTAS computer program running on the computer module for calculating intersection points of the vector and of the envelope with the DTM surface, and
- presenting the intersection points with associated information on the display, whereby target data is acquired passively to avoid emission of radiations.

18. The PTAS according to claim 17, wherein:
- at least one target error-area is shown on the display in association with the target.

19. The PTAS according to claim 17, wherein associated information processed by the computer module, includes:
- a way-point for the observation point and for the target, and
- a range indicating the distance from the observation point to the target and to the at least one target error-area, and
- associated information output in digital format configured for transmission, and for presentation on the display.

20. The PTAS according to claim 19, including:
- a dead-zone detection capability provided by the PTAS computer program, for deriving the distance separating between target error-areas, when more than at least one target error-area is detected, and
- dead-zone and error-area associated information output in digital format configured for transmission, and for presentation of dead-zone and error-area associated information on the display.

21. The PTAS according to claim 17, including:
- a system configuration implemented as an aggregation of readily available modules integrated with added complementary modules and appropriate computer programs.

22. The PTAS according to claim 17, including:
- a platform for operably supporting the PTAS, the platform being selected from the group of static and mobile platforms consisting of platforms based on land, in the air, at sea, and in space, and
- the selected platform being implemented as either one of both a stabilized and a non-stabilized platform.

23. The PTAS according to claim 17, operating in association with a north finding procedure (NFP) computer program, having a coarse north direction reading obtained for input into the computer module, including:
- a north-finding procedure (NFP) computer program running on the computer module for determining an observation zone sector, which is divided into sub-sectors with reference targets being defined therein,
- an active range measuring device being used for actively measure range from the observation point to at least two reference targets,
- at least two actively measured ranges being fed into the computer module, and
- the NFP computer program being run for calculating deviation in azimuth data to the at least two reference targets by respectively associating range as calculated by the PTAS and range as actively measured for deriving a common azimuth deviation factor providing a correction factor for indicating the accurate north.

24. The PTAS according to claim 17, used for rapid north finding, including:
- a specific sighted target chosen on the terrain, toward which a coarse azimuth angle reading is taken together with the observation point location and the elevation angle as measured with the sighting means, for input into the PTAS computer program and calculation of a resulting coarsely calculated target,
- the PTAS computer module being run for display of the DTM surface showing the coarsely calculated target and surrounding terrain containing the specific sighted target, and
- the specific sighted target is detected on the surface of the DTM on display, from which DTM azimuth data to the specific sighted target is retrieved as a true azimuth for input into the PTAS computer program, for correction therewith of the azimuth of the coarsely calculated target.

25. The PTAS according to claim 17, used for rapid north finding, including:
- operating the PTAS for obtaining observation point location and pointing sighting means in the direction of a specific sighted target for display of a DTM surface,
- identifying the selected target on the display and retrieving therefrom an accurate azimuth to the selected target, and
- feeding the accurate azimuth into the PTAS computer program.

* * * * *